(12) United States Patent
Moreau et al.

(10) Patent No.: US 11,113,722 B2
(45) Date of Patent: Sep. 7, 2021

(54) PROVIDING CONTENT RELATED TO SENTIMENT OF PRODUCT FEATURE

(71) Applicant: ADOBE INC., San Jose, CA (US)

(72) Inventors: Stéphane Moreau, L'Hay les Roses (FR); Sachin Soni, New Delhi (IN); Ashish Duggal, Delhi (IN); Anmol Dhawan, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 1058 days.

(21) Appl. No.: 14/869,463

(22) Filed: Sep. 29, 2015

(65) Prior Publication Data

US 2017/0091816 A1  Mar. 30, 2017

(51) Int. Cl.
*G06Q 30/02* (2012.01)
*G06Q 30/06* (2012.01)

(52) U.S. Cl.
CPC ..... *G06Q 30/0255* (2013.01); *G06Q 30/0277* (2013.01); *G06Q 30/0633* (2013.01)

(58) Field of Classification Search
CPC ........... G06Q 30/0255; G06Q 30/0277; G06Q 30/0633
See application file for complete search history.

(56) References Cited

U.S. PATENT DOCUMENTS

| 2009/0024700 A1* | 1/2009 | Garg ................... G06Q 30/02 709/203 |
| 2010/0036828 A1* | 2/2010 | Carmel ............... G06F 16/9535 707/708 |
| 2014/0040010 A1* | 2/2014 | Garcia-Martinez .... G06Q 30/02 705/14.43 |
| 2015/0058103 A1* | 2/2015 | Kirk ................... G06Q 30/0214 705/14.16 |
| 2016/0117726 A1* | 4/2016 | Lee .................... G06Q 30/0255 705/14.53 |
| 2016/0117737 A1* | 4/2016 | Sinha ................. G06Q 30/0276 705/14.44 |

* cited by examiner

*Primary Examiner* — Mario C. Iosif
(74) *Attorney, Agent, or Firm* — Shook, Hardy & Bacon L.L.P.

(57) ABSTRACT

Embodiments of the present invention provide systems, methods, and computer storage media directed to providing targeted content related to sentiment associated with products. In one embodiment, content of a referral source from which a user navigates to arrive at a product page having an item of interest is analyzed. A sentiment of the item based on the analysis of the content within the referral source is determined. Based on the sentiment of the item, targeted content related to the item is identified and provided to the user in an effort to reconcile the determined sentiment of the item.

20 Claims, 8 Drawing Sheets

LANGUAGE: English

The camera is quite nice for one thing - one of the best I've used on any Mobile Device smartphone. The phone's fingerprint sensor has worked flawlessly too. ........ One of the big problems I faced on this phone is battery life.

Click here to learn more about targeted sentiment.

[Visual] [JSON] [API]

| Entities | Target | Type | Sentiment |
|---|---|---|---|
| Keywords | Mobile Device ~402 | Entity | positive |
| Taxonomy | Mobile Device smartphone ~404 | Keyword | positive |
| Concepts | battery life ~406 | Keyword | negative ~408 |
| Document Sentiment | big problems | Keyword | negative ~410 |
| Targeted Sentiment | thing | Keyword | positive |
| Relations | sensor | Keyword | positive |
| Language | camera | Keyword | positive |

PROVIDING CONTENT RELATED TO SENTIMENT OF PRODUCT FEATURE

BACKGROUND

Online consumers oftentimes abandon online shopping carts containing one or more items to be purchased before actually completing a purchase. To the disappointment of online retailers, far too many items are abandoned in online shopping carts. With an increasing shopping cart abandonment rate, online retailers are increasingly foregoing potential revenue. A reduced rate of abandonment and increased number of conversions can be achieved by retargeting online consumers with offers, for example, upon determining a shopping cart abandonment has occurred. For instance, emails sent after consumers abandon shopping carts average a 40% open rate and a 20% click-through rate. Such email offers can be targeted messages personalized for the consumer that are communicated upon determining a shopping cart abandonment has occurred. In particular, when an online consumer is identified as having abandoned a shopping cart, a message can be sent to the consumer nearly immediately that provides a personalized incentive, such as a discount coupon or free shipping, in order to entice the consumer to complete the purchase that was not previously completed.

While incentives, such as discount coupons and free shipping, incentivize or entice some consumers to return to a shopping cart to complete a purchase, many consumers ultimately abandon an online shopping cart based on lack of product or item information. For example, many consumers abandon an online shopping cart to compare product prices on other websites (e.g., competitor websites). Other consumers abandon a shopping cart to research more information about the product, for instance, to identify consumer reviews or product specifications. In such cases of a lack of product information, a discount coupon or free shipping discount may not provide incentive to return to a shopping cart to complete a purchase thereby resulting in a loss of potential revenue.

SUMMARY

Embodiments of the present invention relate to methods, systems, and computer readable media for facilitating providing targeted content to online consumers in an effort to address concerns related to a product(s) included in an online shopping cart, such as a shopping cart deemed abandoned. That is, content related to a consumer sentiment associated with a product is provided to the consumer. To identify potential product sentiment of a consumer, embodiments of the present invention analyze a referral source from which the consumer navigates to arrive at the product site, that is, the web site providing a product of concern for purchase. In this regard, a referral source can indicate a user perspective or sentiment prior to or at the time of navigating to the product site and adding the product to a shopping cart. Based on the potential sentiment of the consumer with regard to a product, targeted content can be provided to the consumer to address a sentiment (e.g., concern) of the product.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Online consumers oftentimes abandon online shopping carts containing one or more items to be purchased before actually completing a purchase. Such abandoned shopping carts, however, can result in a lost opportunity for revenue. As such, in an effort to reduce the shopping cart abandonment rate and increase conversions, online retailers have begun to retarget online consumers with offers. The offers are generally targeted email messages personalized for the consumer that are communicated upon determining a shopping cart abandonment has occurred. In particular, when an online consumer is identified as having abandoned a shopping cart, a message can be sent to the consumer nearly immediately that provides a personalized incentive, such as a discount coupon or free shipping, in order to entice the consumer to complete the purchase that was not previously completed.

Although incentives, such as discount coupons and free shipping, incentivize or entice some consumers to return to a shopping cart to complete a purchase, many consumers abandon an online shopping cart based on lack of product or item information. For example, many consumers abandon an online shopping cart to compare product prices on other websites (e.g., competitor websites). Other consumers abandon a shopping cart to research more information about the product, for instance, to identify consumer reviews or product specifications. In such cases of a lack of product information, a discount coupon or free shipping discount may not incentivize a consumer to return to a shopping cart to complete a purchase.

Embodiments of the present invention relate to methods, systems, and computer readable media for facilitating providing targeted content to online consumers in an effort to address concerns related to a product(s) included in an online shopping cart, such as a shopping cart deemed abandoned. A shopping cart can be deemed abandoned in any manner, such as, for instance, when a consumer has not completed a purchase within a certain period of time after an item has been added to the shopping cart. To identify potential product concerns of a consumer, embodiments of the present invention analyze a referral source from which the consumer navigates to the product site, that is, the web site hosting a product of concern. In this regard, a referral source can indicate a consumer perspective or sentiment prior to or at the time of navigating to the product site and adding the product to a shopping cart. Based on the potential sentiment of the consumer with regard to a product, content can be provided to the consumer to address a sentiment (e.g., feeling, emotion, concern, etc.) of the product. By providing relevant content to consumers that may address the sentiment of the user, the likelihood of a consumer returning to a shopping cart to complete a purchase increases, thereby increasing profitability of online retailers. For example, targeted content such as product specifications, reviews related to a product or product feature, or the like can be provided to the consumer in an effort to alleviate concerns of the consumer.

Although aspects of the invention are generally described as providing targeted content to address a concern in response to detection or prediction of an abandoned shopping cart, embodiments are not intended to be limited herein. For example, targeted content may be provided to a user that has added a product to a shopping cart, but the shopping cart is not yet deemed abandoned. Further, embodiments of the present invention are contemplated for use even when a product has not been added to a shopping cart. For instance, based on a referral source, a consumer viewing a product may be provided with content to entice the user to add the item to a shopping cart for purchase of the item.

Figure 1:
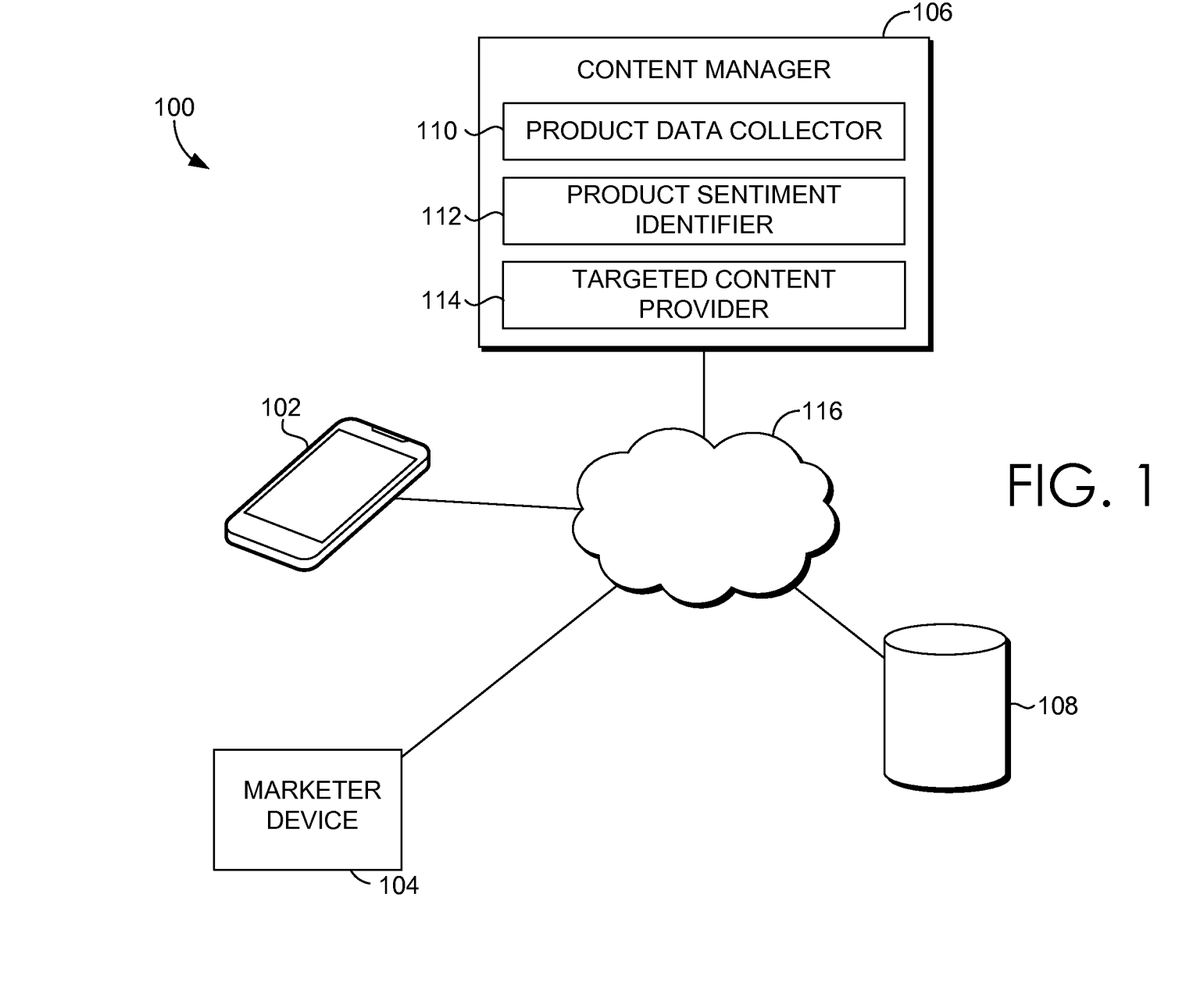
FIG. 1 is a schematic depiction of a system for providing content related to sentiment of a product, in accordance with embodiments of the present invention.

Turning now to FIG. 1, a schematic depiction is provided illustrating an exemplary system 100 in which some embodiments of the present invention may be employed. Among other components not shown, the environment 100 may include consumer device 102, marketer device 104, content manager 106, and a data store 108. It should be understood that the system 100 shown in FIG. 1 is an example of one suitable computing system. Any of the components shown in FIG. 1 may be implemented via any type of computing device, such as computing device 900 described with reference to FIG. 9, for example. The components may communicate with each other via one or more networks 116, which may include, without limitation, one or more local area networks (LANs) and/or wide area networks (WANs). Such networking environments are commonplace in offices, enterprise-wide computer networks, intranets, and the Internet.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, system 100 facilitates providing targeted content to online consumers in an effort to address sentiment related to a product(s) included in an online shopping cart, such as a shopping cart deemed abandoned. A referral source is generally used to determine a user perspective or sentiment prior to or at the time of navigating to the product site and adding the product to a shopping cart. Based on the potential sentiment of the consumer with regard to a product, content can be provided to the consumer to address a sentiment (e.g., feeling, emotion, concern, etc.) of the product.

Figure 2:
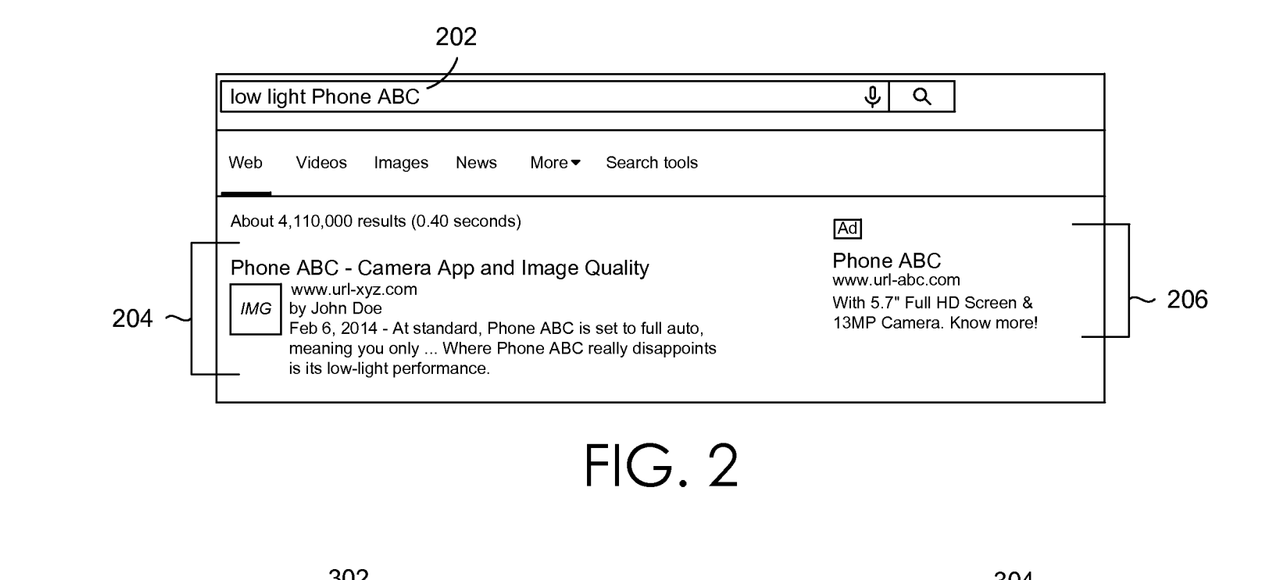
FIG. 2 is a user interface display showing exemplary referral source, in accordance with embodiments of the present invention.

By way of example, and with reference to FIG. 2, assume a user searched via a search engine using search phrase "low light Phone ABC camera" 202, which resulted in search result 204 and advertisement 206. Further assume that the search result 204 states that "the Phone ABC really disappoints in its low-light performance." In such a case, if the user selects the advertisement 206 (i.e., a referral source) to arrive at a product page (i.e., marketer's website), adds the Phone ABC product to the shopping cart, and then abandons the cart, it can be assumed that the user may be concerned regarding low-light performance of the camera and may have abandoned the shopping cart to read/review about low-light performance of the camera in the Phone ABC. As such, it can be determined that the user sentiment for the camera will be negative and targeted content to address or alleviate such a concern can be provided to the consumer.

Figure 3:
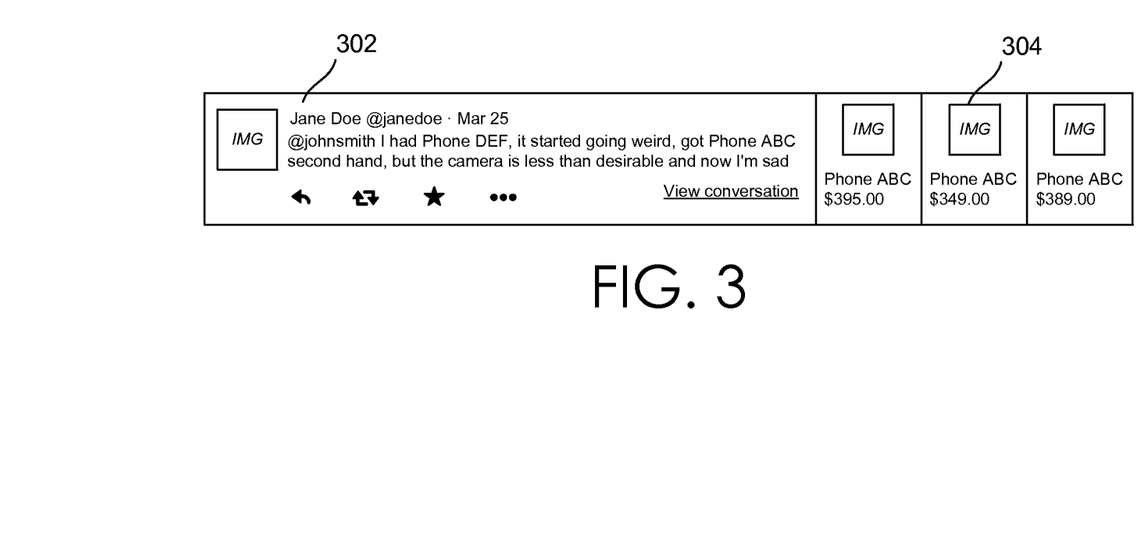
FIG. 3 is a user interface display showing another exemplary referral source, in accordance with embodiments of the present invention.

As another example, and with reference to FIG. 3, assume a user reads about a "Phone ABC" on a public social forum 302. Further assume that the user selects an advertisement 304 placed near the posted content, which navigates to a "Phone ABC" webpage on an ecommerce website. A user arriving at the product page after selecting advertisement 304 has likely read that competitor's product camera is better as compared to marketer's product camera as per one user's comments. In such a case, a user that adds the "Phone ABC" to a shopping cart and then abandons the cart may have done so due to a concern of the camera of the "Phone ABC" being inferior compared to the competitor's device. As such, targeted content may be provided to the user to address this concern by highlighting or including a few social conversation/forums that convey that "Phone ABC" has superior camera compared to the competitor's product. Further, other features where the "Phone ABC" scores higher than the competitor's device can be provided to the user.

Returning to FIG. 1, in operation, the consumer device 102 and marketer device 104 can access the content manager 106 over a network 116 (e.g., a LAN or the Internet). For instance, the consumer 102 and marketer device 104 may provide and/or receive data from the content manager 106 via the network 116. Network 116 may include multiple networks, or a network of networks, but is shown in simple form so as not to obscure aspects of the present disclosure. By way of example, network 116 can include one or more wide area networks (WANs), one or more local area networks (LANs), one or more public networks, such as the Internet, and/or one or more private networks. Networking environments are commonplace in offices, enterprise-wide computer networks, intranets, and the Internet. Accordingly, network 106 is not described in significant detail.

A consumer device, such as consumer device 102, may be any computing device that is capable of presenting content to a consumer, for example, via a web browser or application installed thereon. In particular, and in accordance with embodiments described herein, consumer device 102 presents content to address a sentiment of a product, for instance, a product deemed to be abandoned in a shopping cart. The consumer device 102 may be operated by a user or consumer that might potentially electronically purchase a product, for example, offered via a website. While only one consumer device 102 is illustrated in FIG. 1, multiple consumer devices associated with any number of users may be utilized to carry out embodiments described herein. The consumer device 102 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the consumer device 102 may include one or more processors, and one or more computer-readable media. The computer-readable media may include computer-readable instructions executable by the one or more processors.

A marketer device, such as marketer device 104, may be any computing device that is capable of facilitating a marketer to provide data that may be used to identify or provide targeted content related to a consumer(s) sentiment of a product. For example, a marketer may provide targeted content or product data to the content manager 106 via a browser or application installed on the marketer device 104. In some cases, the marketer device accesses the content manager via a web browser, terminal, or standalone PC application operable on the marketer device. Marketer device 104 might be operated by an administrator, which may be an individual(s) that manages marketing associated with a product, a website, an application, or the like. While only one marketer device 104 is illustrated in FIG. 1, multiple marketer devices associated with any number of marketers may be utilized to carry out embodiments described herein. The marketer device 104 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the marketer device 104 may include one or more processors, and one or more computer-readable media. The computer-readable media may include computer-readable instructions executable by the one or more processors.

The data store 108 includes data used to identify, select, or provide targeted content. As described in more detail below, the data store 108 may include product data, such as product feature data, competitor data, related feature data, or related competitor data. The data store 108 may also include sentiments and/or targeted content associated with products. Such product data, sentiments, and/or targeted content may be stored in the data store 108 and accessible to any component of the system 100. The data may also be updated at any time. In embodiments, the product data, or portion thereof, is updated dynamically or, in real-time, as a user reviews additional content or at any point when data changes.

The content manager 106 is generally configured to provide content related to sentiment of a product or product feature. A content manager may include a product data collector 110, a product sentiment identifier 112, and a targeted content provider 114. Although illustrated as separate components of the content manager 106, any number of components can be used to perform the functionality described herein. Further, although illustrated as being a part of a content manager, the components can be distributed via any number of devices. For example, a product data collector can be provided via one device, server, or cluster of servers, while the product sentiment identifier can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

The product data collector 110 is configured to collect or obtain product data. Product data refers to data associated with or related to a product. In embodiments, product data refers to data that corresponds with a product provided for purchase via an online retailer. Product data may include data related to a feature of a product (product feature data), a competitor of a product (competitor data), or data related therewith (related feature data or related competitor data).

Product feature data refers to any data associated with a product feature. A product feature refers to any feature or aspect associated with a product. A product feature might be a word or phrase (keyword) that describes, characterizes, or indicates an aspect of a product. For example, a product feature refers to a term or phrase, sometimes referred to as a keyword, that corresponds with a product. Competitor data refers to any data associated with a competitor or competitor product. Competitor data may include, for example, identifiers of a competitor or competitor product, a description or keyword associated with a competitor or competitor product, or the like. Related data, such as related feature data or related competitor data, refers to data that relates to other data, such as a product feature or competitor data, respectively.

Product data can be collected or obtained in any manner. In some cases, product data is provided by a marketer of the product. In this regard, a marketer might enter or input data, for example, via a website accessible by way of a browser or an application on marketer device 104. As an example, a marketer might enter or select product data, such as product features, related terms, or competitor data, via marketer device 104 that is connected to the network 116. For instance, a marketer might provide a list of important keywords for a web site or webpage associated with a product or select important keywords, for example, from a list of potential keywords extracted as described below.

Additionally or alternatively, product data can be derived or determined. In this regard, a product page (e.g., webpage or application page) describing or mentioning the product may be analyzed to detect product features and/or related product features. For example, a webpage or application page including a product available for purchase can be analyzed to detect product features and/or related product features associated with the product. In some cases, natural language processing can be used to detect product data. For instance, product content associated with a product can be passed through a text/content analysis engine, such as Semantria® Engine or any other NLP Engine (e.g., Natural Language Toolkit trained under domain/vertical specific ontology). Such a text/content analysis engine can be used to extract data, such as product features. By way of example only, features (e.g., keywords such as camera, display, battery, s-health, etc.) of a mobile device product might be extracted from a mobile device product page.

As described, a natural language process that performs part-of-speech tagging (i.e., NLP POS tagging) can be used. To this end, an n-gram part of speech (POS) tagger trained on the vertical, or brand specific, ontology can identify important or relevant keywords or features mentioned in the marketer's website or product page. For example, a statistical autotagger or summarizer can be used. A statistical autotagger generally identifies term n-grams as features and uses a categorization ontology to classify extracted features to determine an overall topic model for the input document. Identified categories can be used as metadata tags to tag the input text. A statistical summarizer generally identifies important document terms and concepts and uses these features to select sentences from the text in order to produce one or more subject-based "gists" of the original document.

As another example, natural language toolkit (NLKT) part of speech (POS) tagging can be used, for instance, using WordNet® dictionary. One text mining approach that can be used to identify important keywords in a marketer's website or webpage page using NLTK is provided using a URL of the webpage. Upon identifying a URL of a webpage, text can be obtained from webpage, for instance, using the function "raw=nltk.clean_html( )" to take an HTML string and return raw text. The raw text can then be tokenized (e.g., using "tokens=nitk.word_tokenize (raw)"), and the tokenized text can be converted to lower case (e.g., using "words= [w.lower( ) for w in tokens]"). Stemming and lemmatization can then be performed to identify stems of the words and return words in a base or dictionary form, respectively. Part-of-speech tagging can then be applied to classify words into a part-of-speech and labeling the word accordingly (e.g., noun, proper noun, verb, adjective, pronoun, article, etc.). Nouns and proper nouns (e.g., camera, battery, s-health, display, etc.) can be identified to identify subject the particular text mentions and, in some cases, ordered based on their frequency in the normalized text.

Competitor data may also be derived or determined. In this regard, a social forum or set of products may be analyzed to detect competitors or potential competitors. For example, a blog or best product lists can be analyzed to detect competitors associated with a product. In some cases, natural language processing can be used to detect competitor data.

Related terms of product data and/or competitor data may also be derived or determined. A related term of product data refers to a term or phrase that is related to or similar to a product data, such as a product feature. A related term might be, for instance, a synonym, hypolym, hypernum, or meronym associated with a product data (e.g., product feature) or competitor data. By capturing related terms, the system 100 is able to identify keyword frequency and/or sentiments for content that may have otherwise been discarded as not including a keyword. This, in turn, will further improve the identified sentiments.

A related term may be identified using related terms on forums, blogs, online discussions, or other social channels. For instance, an individual might state the following on a social forum, "The photos that I took from [a mobile device] are really amazing." Because the individual is talking about the camera, it is desirable to figure out that the term photo is related to the term camera. In some embodiments, identifying related terms uses semantic distance or similarity between two terms X and Y, where each term is an N-gram word sequence. In some cases, to compute semantic distance or similarity between terms, terms can be case normalized, stemmed (e.g., Porter Stemmer), and/or depluralized and, thereafter, used to create models that can be used to compute a semantic distance or similarity between terms (e.g., Jaccard distance or similarity=1−distance). In other cases, lexicon ontology (e.g., WordNet®) can be used to compute a space of local terms, such as synonyms, hyponyms, hypernyms, and/or meronyms. Matches that occur between X and synonyms of Y receive high scores (i.e., (X,Y) are very similar), matches between X and hypernyms or hyponyms may receive slightly lower scores due to the generalization or specialization that is occurring respectively, and matches between X and meronyms of Y may get slightly lower scores. In yet other cases, a set of semantically related and similar terms are learned and organized these into a phrase lexicon ontology. Given X, the ontology would be searched to find the closest Y terms. The ontology may be built using terms learned from a contextual corpus, or using more advanced methods such as high dimension word feature vector similarity e.g., word2vect.

The product data to identify may be identified within content previously supplied by, for example, the marketer. For instance, a marketer may provide pages for a particular product where the pages include product descriptions, product features, etc. In other cases, content from which to identify product data, such as product features, might be automatically identified, for example, by crawling websites.

Any number of methods can be used to identify or collect product data, competitor data, or terms related thereto. The above methods are only provided as examples of possible implementations that may be employed in accordance with embodiments of the present invention. Further, as can be appreciated, any number of product, competitor, or related data may be obtained. In some cases, data deemed relevant or beyond a threshold or relevancy might be selected, for example, such as most valuable or important features or competitors. Further, obtaining product, competitor, or related data might happen at any time. For instance, in some cases, product data associated with a product or competitor might be obtained on a single occasion or updated as provided by a marketer or analysis.

The product sentiment identifier 112 is generally configured to identify sentiment related to a product (product sentiment). Sentiment generally refers to a view of, attitude toward, general feeling, opinion or emotion. In embodiments, the product sentiment identifier 112 determines sentiment related to a product with respect to a feature or competitor of the product. In this regard, in addition to or in the alternative to determining sentiment of a product generally, sentiment of a particular aspect of the product can be identified or sentiment of a particular competitor of a product (generally referred to herein as product sentiment).

To identify product sentiment, embodiments of the present invention utilize content presented within a referral source that may have been viewed by the consumer. A referral source refers to a source (e.g., website, webpage, application page) that was visited just prior to the consumer navigating to the product page. In this regard, a referral source is one from which a user navigated to arrive at a product page. By way of example, and not limitation, a referral source may be a social content web page, a blog web page, a product review web page, a search results page, or the like. Although referral source is generally referred to herein as visited just prior to the consumer navigating to the product page, it is contemplated that a referral source may include additional sources, such as sources visited within a predetermined time period of arriving at a product page, sources visited within a same session of arriving at a product page, or the like.

A referral source can be identified in any number of ways. In one embodiment, a referral source identifier, such as a referral source URL, is obtained in accordance with a user adding a product to the electronic shopping cart. In another embodiment, a referral source identifier (e.g., referral source URL) is obtained or received upon recognizing a shopping cart having a product(s) is abandoned. Shopping cart abandonment can be recognized or detected in any number of ways and is not intended to limit the scope of embodiments of the present invention. For example, in some cases, shopping cart abandonment may be determined based on a period of inactivity, based on perceived user intentions, or the like. Generally, with a shopping cart abandonment, the product or item remains in the shopping cart, but is deemed abandoned for any number of reasons (e.g., period of purchase inactivity). In other cases, a shopping cart abandonment may be determined after an item has been removed from a shopping cart. An indication of a referral source can be provided along with any number of other data. For example, in some cases, a product identifier of a product in a shopping cart may also be obtained as well as a user identifier (e.g., email ID).

With an indication of a referral source, referral content can be referenced. Referral content refers to content associated with the referral source. For instance, referral content may be content of the referring social conversation or referring webpage. As another example, referral content for a search engine referral may be the displayed content of search results near the advertisement or link to arrive at the marketer's product page.

The product sentiment identifier analyzes the referral content to determine product sentiment, for example, related to a feature(s) or competitor(s) of a product. Various methods of analyzing referral content are contemplated in association with embodiments of the present invention. Generally, the referral content can be analyzed to determine features, related features, and/or competitors. In some cases, the features, related features, competitors, and/or related competitors to identify in the referral content can be referenced from the product data collector. As previously described, the data may be provided or determined by any number of sources, such as the marketer, automatic detection, or the like.

Upon identifying the features, related features, or competitors, the referral content can be analyzed to identify term frequency of features, term frequency or related features, term frequency of competitor, and/or term frequency of related competitor. In some cases, the referral content may be passed through a term frequency tagger one or more times to determine such frequencies. For example, the referral content may be passed through a term frequency tagger to determine the term frequency of every feature or any of its related terms in the source referring page. If a feature has greater than 0 term frequency, it signifies that the feature is mentioned at the source referring page. Further, a higher term frequency indicates a higher number of times it is mentioned at the source referring page. Thereafter, the referral content can be passed through a term frequency tagger (same or different) to determine the term frequency for every competitor product in the source content.

Upon identifying term frequencies, such as term frequency of a feature(s), related feature(s), competitor(s), and/or related competitor(s), the term frequencies can be used to determine sentiment. Sentiment can be expressed or represented in any number of ways. For example, sentiment might be expressed using numerical values (e.g., a numerical ranking from 0-5), a term, phrase, or other indicator (e.g., positive, negative, etc.). Sentiment values may be numerical values assigned from a predetermined range of numerical values. By way of example only, the range of values may include a value at the upper end of the range having a positive sentiment value and a second value at the lower or opposite end of the range having a negative sentiment value. In some cases, when the sentiment is less than a predetermined value, the sentiment may be designated as having a negative sentiment. On the other hand, when the sentiment is greater than a predetermined value Y, the sentiment is designated as having a positive sentiment.

In some cases, sentiment is identified for each feature, related feature, competitor, or related competitor, for example, those collected in the product data collector. In other cases, sentiment is identified for a portion thereof. In this regard, sentiment might be identified for features, related features, competitors, or related competitors that exceeds a threshold value of term frequencies, such as 0, 3, 5, etc. For example, the frequency of each keyword may be evaluated to determine whether the frequency is greater than a predetermined threshold value. For instance, if the frequency of the keyword is greater than a value X, a sentiment value can be determined. In the event that the frequency is not greater than the predetermined value X, then a sentiment value may not be determined. Keyword sentiment values may be identified for multiple keywords in a single piece of content. For example, the statement "great battery life but camera quality has gone down" would result in a positive sentiment for the battery keyword but a negative sentiment for the camera keyword.

In one implementation, if none of the competitors are mentioned in the referral content, that is, the term frequency of every competitor is 0, a sentiment is determined for each feature whose term frequency is greater than 0 (e.g., on a scale of 1-10 where 10 is highly positive and 1 is highly negative) of the feature. If any of the competitors are mentioned, for each competitor, it is identified if the marketer's product has a higher or lower sentiment than the competitor for the feature for every feature that has a greater than 0 term frequency.

Sentiment values may be determined by passing the referral content through a keyword level sentiment engine, which is capable of finding the sentiment associated with a particular feature in given content. As can be appreciated, in some cases, referring pages might only be analyzed once for sentiment values with such values saved. In other cases, the analysis might be performed on a periodic basis, upon detection of a shopping cart abandonment, or upon a modification of source content. By way of example, when a user visits from a source referral, an entity tag (ETag) of the source URL can be stored. Entity tags can be used to determine if a webpage has been modified. As such, next time another user visits from the same source referral, the current entity tag can be compared to the previously stored entity tag. If the entity tags are same, analysis of the content of source referral page can be avoided and the existing cached sentiment analysis can be utilized. On the other hand, if the entity tags are not the same, the content can be reanalyzed to result in a more current sentiment. As another example, with respect to referring search results that may change over time, for top referring keywords and phrases, a daemon process can be run at regular interval of times. On each run, search results near the ad can be identified. Thereafter, the sentiment associate therewith can be identified and stored.

Figure 4:
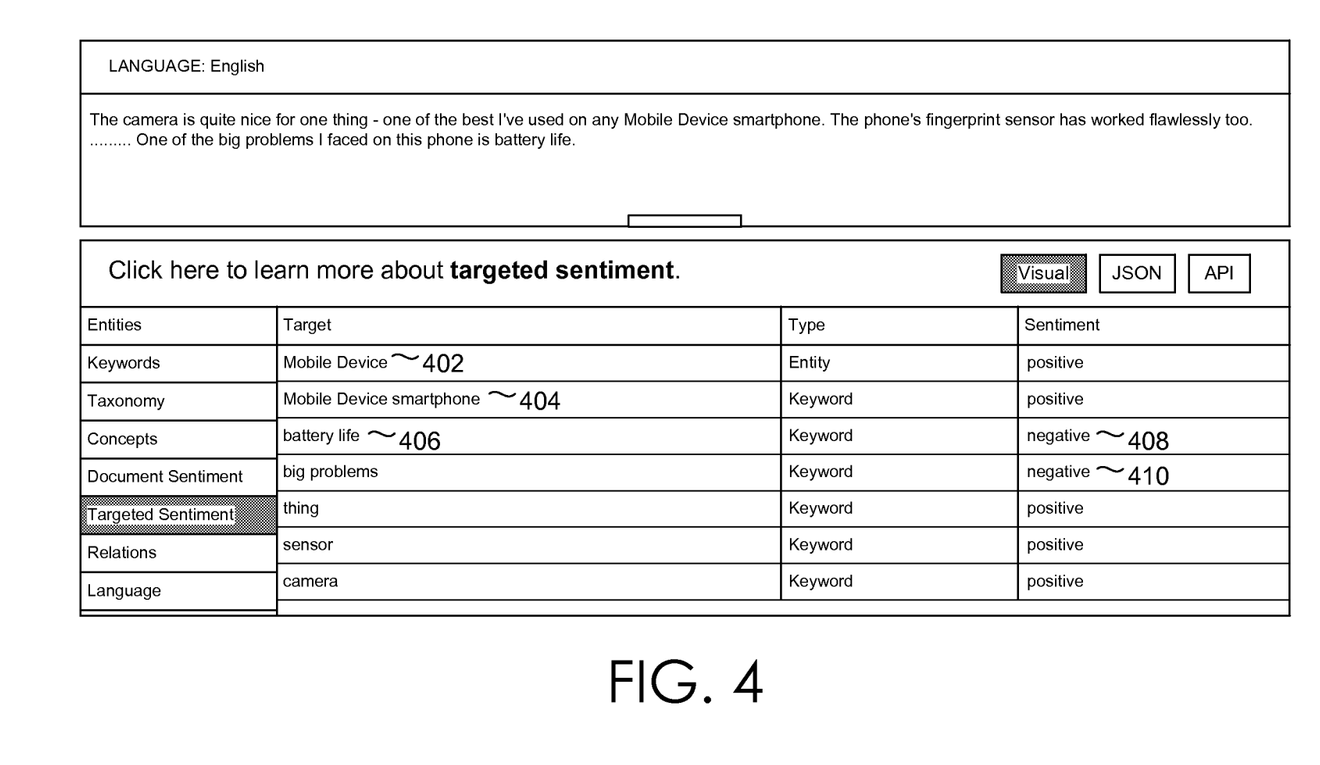
FIG. 4 is a user display interface illustrating sentiments associated with features according to an example embodiment.

Keyword level sentiment engines, such as AlchemyAPI™, generally provide the ability to extract sentiment, for example, related to keywords (e.g., product keywords or product features). In this regard, sentiment engines can detect, extract, and weight sentence affect and sentiment signal using a general purpose sentiment vocabulary combined with a NLP engine. Input, including part-of-speech and noun-phrase (NX)/verb-phrase (VX) tagged sentences, can be used to determine and score positive, negative, and neutral sentiment. For example, and with reference to FIG. 4, assume that a review of a "Mobile Device" containing a link to a mobile device product webpage recites "The camera is quite nice for one thing—one of the best I've used on any [mobile device] smartphone. The phone's fingerprint sensor has worked flawlessly too . . . . One of the big problems I faced on this phone is battery life." As illustrated, the targeted sentiments related to various targets such as "mobile device" 402, "Mobile Device Smartphone" 404, "battery life" 406, etc. are provided, with the keywords of "battery life" and "big problems" indicated as a negative sentiment 408 and 410, respectively. In this example, it is assumed that any reader that reads this excerpt will have a positive sentiment towards camera, but negative sentiment towards battery life.

Targeted content provider 114 is configured to generate, select, and/or provide targeted content. Targeted content refers to content that is relevant to or targets a sentiment of a user, for example, a sentiment related to a product, product feature, or competitor. The targeted content may be text, advertisements, offers, videos, messages, reviews, text snippets, product descriptions, summaries, or other content that is intended to address a determined sentiment associated with a product, for instance, a product abandoned in an electronic shopping cart.

The targeted content provider 114 can generate, select, or provide targeted content based on the sentiment of the consumer. The targeted content may be focused on positive sentiment, neutral sentiment, and/or negative sentiment. For instance, it may be desirable to provide users with a positive message or offer (e.g., discount, coupon, etc.) associated with a product in order to further encourage interest in the form of, for instance, a purchase. Alternatively, it may be desirable to provide targeted content addressing a negative sentiment to alleviate concerns of the user. Appropriate positive content can be selected to allay concerns in the mind of cart abandoners. By way of example only, assume a user has read negative comments about a camera on a referring review blog. In such a case, positive targeted content on the camera with a link to a review blog can be selected to provide to the consumer.

Targeted content may be selected for any number of features of which the user may have a concern (e.g., negative sentiment), features for which user may prefer a competitor's product, preferences for a competitor or competitor product, and/or the like. For example, in some cases, targeted content may be selected for each feature for which a consumer is deemed to have a negative sentiment or sentiment below or above a sentiment threshold (e.g., sentiment less than 5 on a scale of 1-10), for features where the user might think that a competitor product is better, etc.

In some implementations, in cases that more than one feature associated with a negative mindset exists, the features can be ranked based on a feature score or value. A feature score refers to an indication of sentiment related to a feature. Targeted content can then be selected and provided corresponding with a feature of set of features (e.g., above or below a threshold) associated with feature scores indicating a greatest negative mindset. For example, a feature score might equal feature term frequency*(5-feature sentiment in referral source content), wherein 5 is a neutral sentiment value on a scale of 1-10.

As can be appreciated, targeted content may also be selected based on type of referral source. For example, assume that a referral source includes product reviews by blogs/magazines. In such a case, the selected targeted content may be content including text or links to text of review blogs. As another example, assume that a referral source is a social conversation/forum. In such a case, the targeted content can correspond with text from other social conversations/forums that allay concerns associated with a product feature.

A set of potential targeted content from which a selection can be made to provide to a consumer can be provided in any number of manners. In some cases, targeted content can be identified automatically, for example, based on web crawling to identify content related to a product. In other cases, targeted content can be provided by, for example, a marketer via marketer device 104. To this end, a marketer or other entity can provide targeted content, such as videos, advertisements, text, summaries, reviews, snippets, offers, etc. For example, for each feature in a set of features of a product, a marketer might provide a summary or description of the feature that can be used in the subject of a targeting email; a detailed description of the feature that can be used in the body of a targeting email; a set of product review, blogs, discussions that are positive in relation to a feature; a set of social posts that are positive in relation to a feature; or the like. As another example, for every competitor in a list of competitors, a marketer may provide a brief description that describes how marketer's product is superior compared to the competitor for a feature; a detailed description that describes how the marketer's product is superior compared to the competitor for a feature; a set of product review blogs, discussions that are positive in relation to a feature as compared to the competitor; a set of public social posts that are positive in relation to a feature compared to the competitor; or the like. In some embodiments, the marketer may further indicate the product data to which the targeted content is intended to supplement. For example, a first product review may be designated as corresponding with a first product feature, and a second product review may be designated as corresponding with a second product feature.

Figure 5:
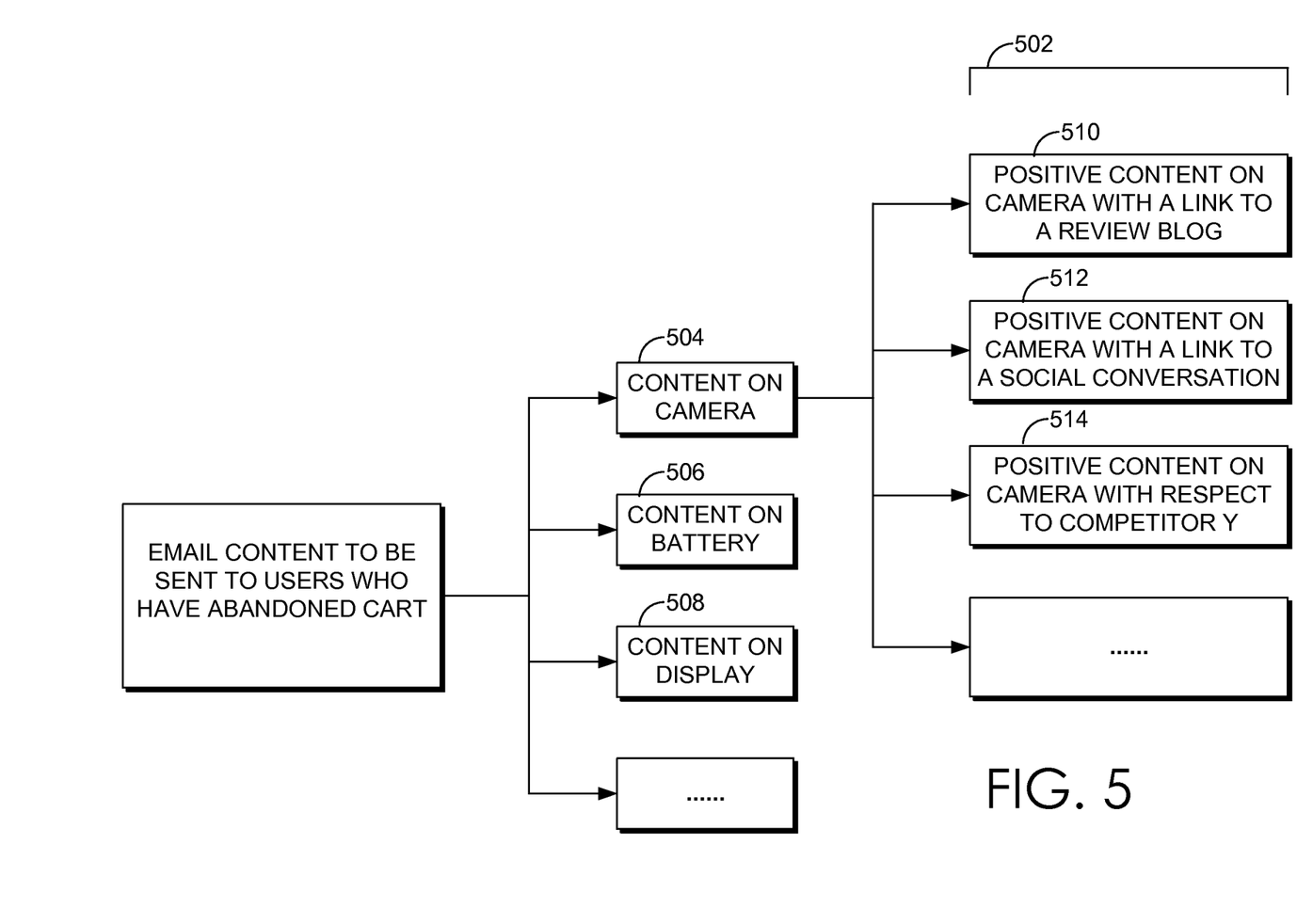
FIG. 5 is a block chart illustrating an exemplary set of targeted content, in accordance with embodiments of the present invention.

In some implementations, a portal may be accessed and used to provide targeted content. For instance, a portal may be accessed and used to specify positive targeted content for various feature in different scenarios. By way of example only, and with reference to FIG. 5, a set of positive targeted content 502 can be provided in association with a product feature of a camera 504. Although not illustrated, a set of positive targeted content can also be provided in association with other product features, including battery 506 and display 508. Each set of positive targeted content may include various types of information. As shown as one example in FIG. 5, positive content associated with a review blog source 510, positive content associated with a social conversation source 512, and positive content associated with a competitor 514 may be provided. Such data can be stored and accessed for providing to consumers.

Upon selecting appropriate targeted content, the targeted content provider 114 can then communicate the targeted content. The communication of the targeted content may be done in various ways and in various formats (e.g., email, instant messages, text messages, notifications, etc.). The targeted content may be communicated directly to the user and, thus, a user device associated with the user such as, for example, the user's smartphone or tablet. Alternatively, the targeted content may be communicated to a device associated with the item of interest. For instance, the targeted content may be provided to the marketer or other entity such that the marketer or other entity can provide to the consumer in a time and manner as designated by the marketer.

In some embodiments, the targeted content provider 114 communicates the targeted content such that more than one user is targeted at the same time and/or at the same device. For example, for a targeted content, a marketer might define a target population, e.g., "Email IDs of recipients included in a given folder/list," wherein the given folder/list may include users that have read negative information about a camera on a referring review blog. Recipients may be dynamically added and/or removed from such a list.

The targeted content provider 114 may additionally or alternatively communicate the sentiment data to a third-party user. A third-party user may be any party besides the user for which the sentiment data applies. Exemplary third-party users include retail store representatives (e.g., salespeople). The sentiment data may be used by the third-party users to quickly identify content that was of interest and positive to a user and content that the user felt negatively about or had apprehensions. This enables the third-party user to utilize the sentiment data to provided targeted content, for example, to boast on the positive sentiment items or to alleviate concerns associated with negative sentiment items.

As described, the selected targeted content may be provided in any number of forms such as email, instant messages, text messages, notifications, etc. For example, targeted content may be provided in an email, such as a dynamically created email that contains one or more targeted content portions and a link to the abandoned shopping cart. For example, a first dynamically generated email may include a first targeted content for users who read negative information about a camera on a referring review blog, and a second dynamically generated email may include a second targeted content for users that read negative information about a camera as well as a battery on a referring review blog.

Figure 6:
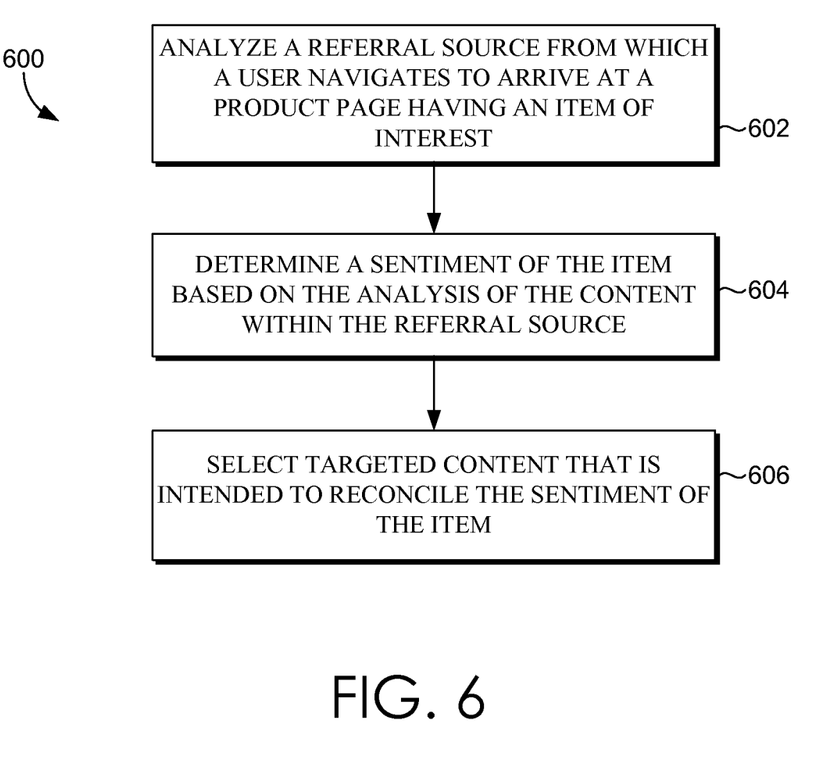
FIG. 6 is a flow diagram showing a first method for providing targeted content related to sentiment of a product, in accordance with an embodiment of the present invention.

Turning now to FIG. 6, a flow chart is illustrated showing an exemplary method 600 of providing targeted content related to sentiment of a product, or product feature. In embodiments, the method 600 is performed by a content manager, such as content manager 106 of FIG. 1. Initially, and as indicated at block 602, a referral source from which a user navigates to arrive at a product page having an item of interest is analyzed. In some embodiments, a referral source can be identified in association with an abandonment of the item in an electronic shopping cart. At block 604, a sentiment of the item is determined based on the analysis of the content within the referral source. In this regard, keywords in the referral source can be identified and assessed for sentiment associated therewith. At block 606, targeted content that is intended to reconcile the sentiment of the item is selected. For example, for a negative sentiment, positive targeted content related to the negative sentiment can be selected. At block 608, the targeted content is provided, for example, to the user device.

Figure 7:
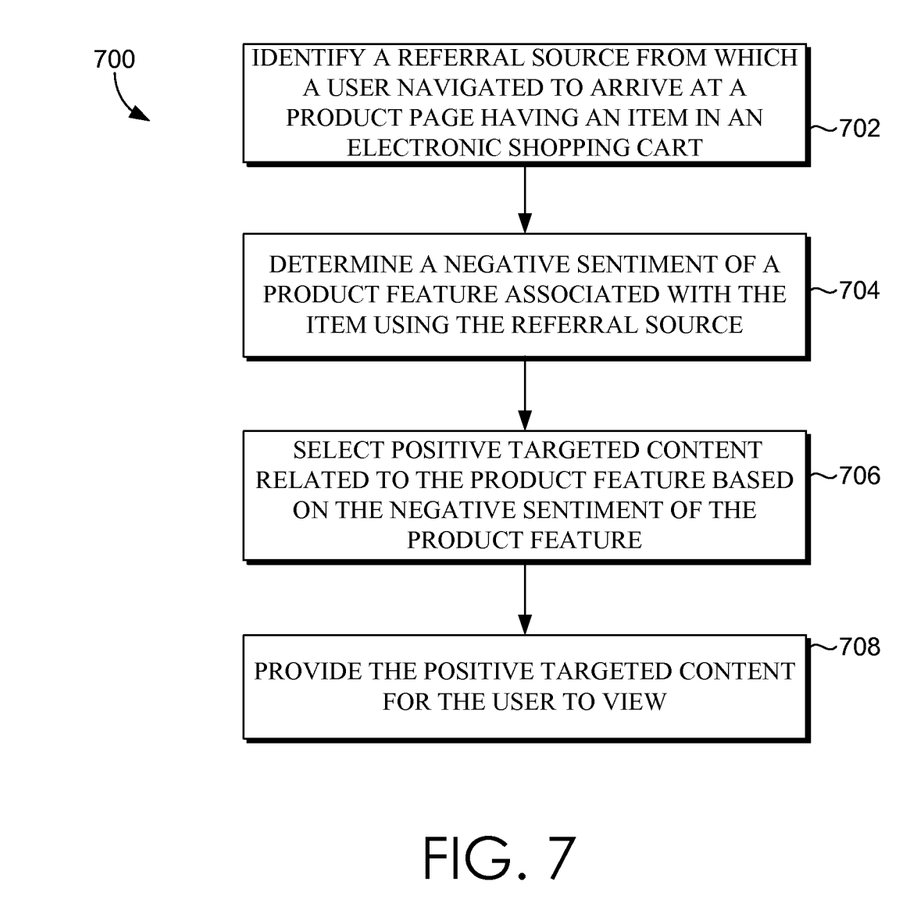
FIG. 7 is a flow diagram showing a second method for providing targeted content related to sentiment of a product, in accordance with an embodiment of the present invention.

Referring now to FIG. 7, a flow diagram shows a method 700 for providing targeted content related to sentiment of a product, or product feature. Initially, at block 702, a referral source from which a user navigated to arrive at a product page having an item in an electronic shopping cart is identified. For example, a referral source may be identified upon a determination that the item in the electronic shopping cart is abandoned. At block 704, a negative sentiment of a product feature associated with the item is determined using the referral source. In this regard, the referral source can be analyzed to determine negative sentiment of a product feature. Based on the negative sentiment of the product feature, at block 706, positive targeted content related to the product feature is selected in an effort to address the negative sentiment of the product feature. Thereafter, at block 708, the positive targeted content is provided for the user to view.

Figure 8:
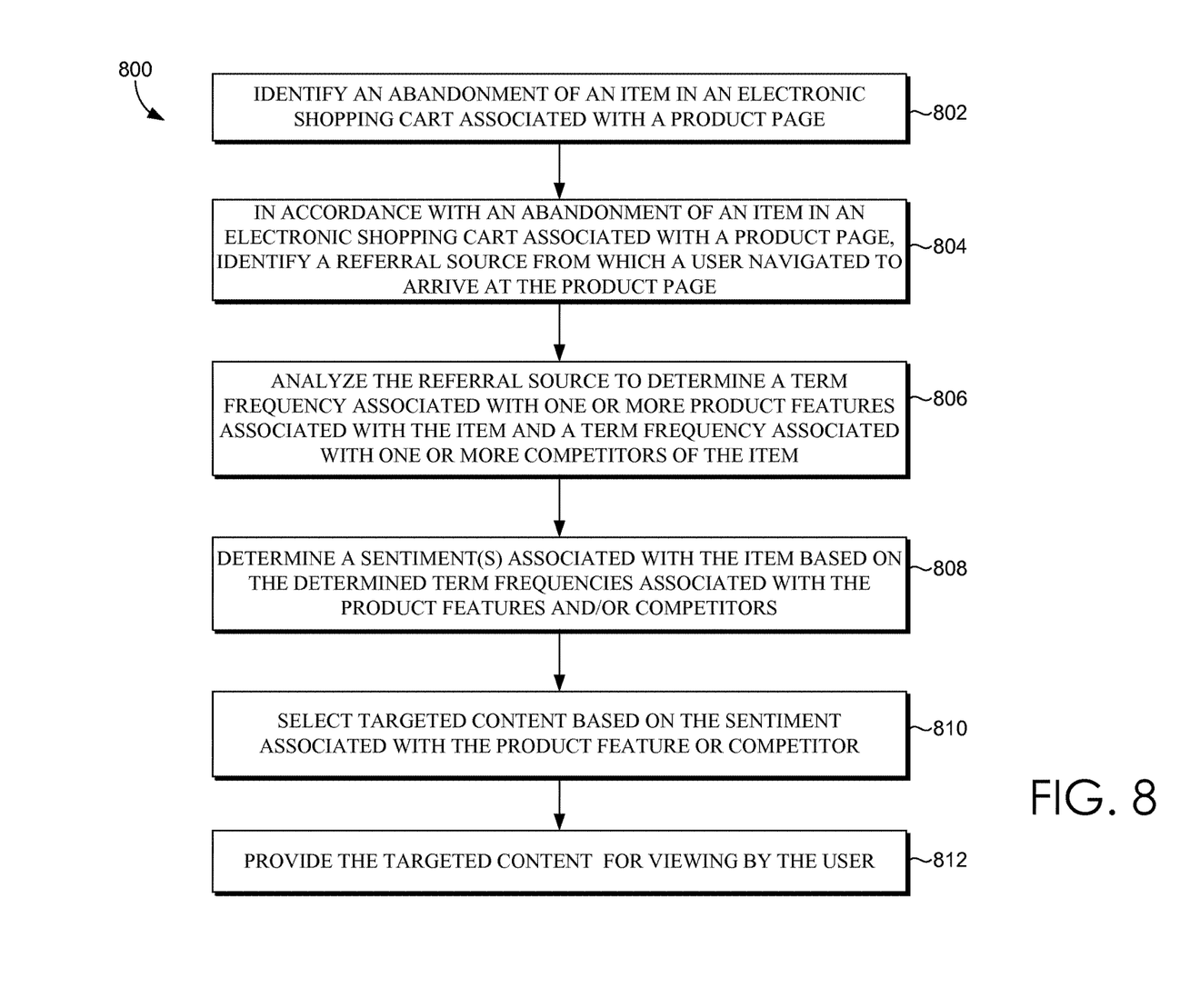
FIG. 8 is a flow diagram showing a third method for providing targeted content related to sentiment of a product, in accordance with an embodiment of the present invention.

With reference now to FIG. 8, a flow diagram shows a method 800 for providing targeted content related to sentiment of a product, or product feature. Initially, at block 802, an abandonment of an item in an electronic shopping cart associated with a product page is identified. At block 804, in accordance with an abandonment of an item in an electronic shopping cart associated with a product page, a referral source from which a user navigated to arrive at the product page is identified. At block 806, the referral source is analyzed to determine a term frequency associated with one or more product features associated with the item and a term frequency associated with one or more competitors of the item. Such product features and/or competitors for which term frequencies in the referral source are determined may be input by an entity, such as a marketer. At block 808, a sentiment(s) associated with the item is determined based on the determined term frequencies associated with the product features and/or competitors. For instance, when the term frequency associated with each of the competitors of the item is below a competitor threshold value, sentiment is determined in association with at least one product feature associated with the item. On the other hand, when the term frequency associated with at least one competitor of the item meets or exceeds a competitor threshold value, sentiment is determined in association with the at least one competitor of the item. At block 810, targeted content is selected based on the sentiment associated with the product feature or competitor. At block 812, the targeted content is provided for viewing by the user, wherein the targeted content is selected in accordance with the determined sentiments in an effort to reconcile the sentiment associated with the item.

Figure 9:
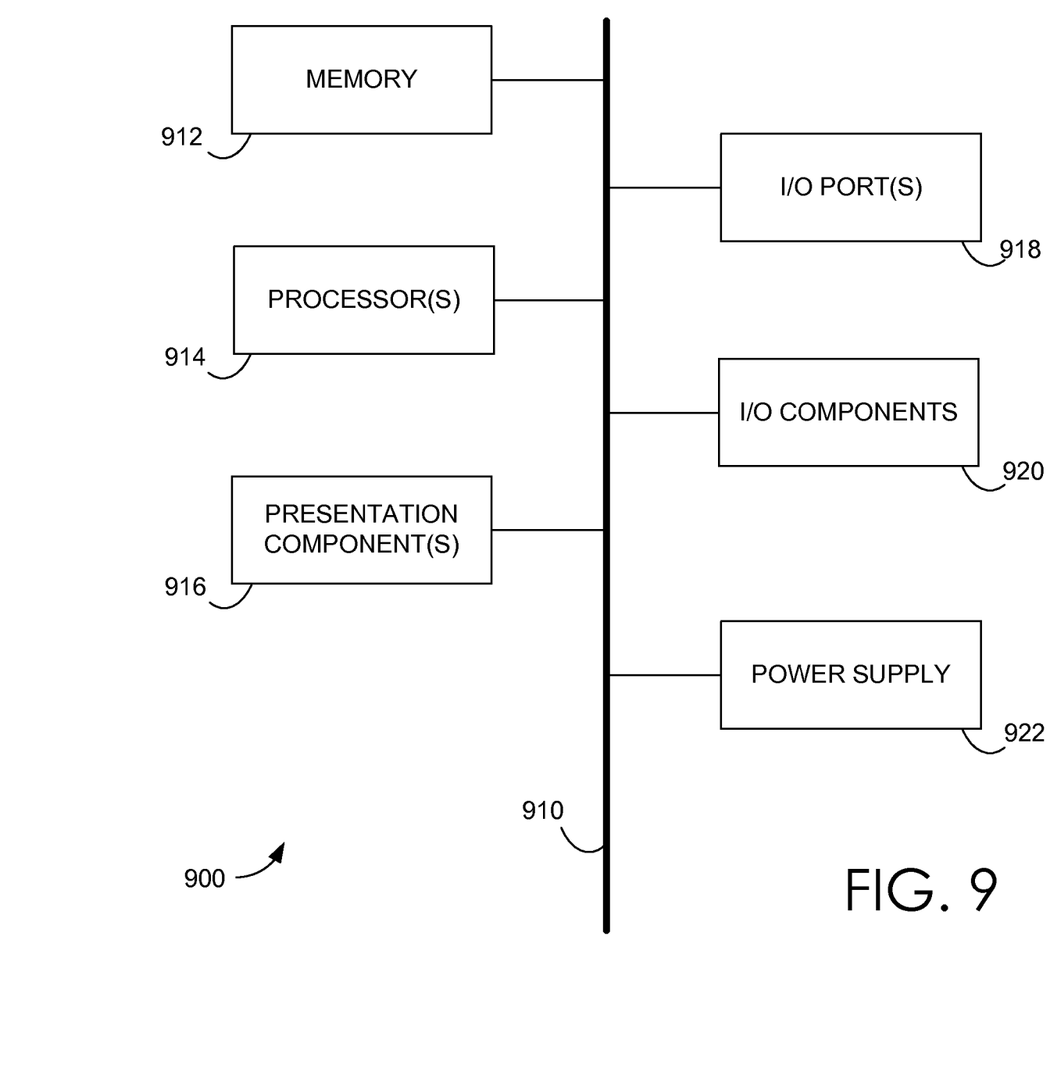
FIG. 9 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, hosting a plurality of copies of a digital content. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to provide targeted content related to sentiment associated with products, the operations comprising:
in accordance with an abandonment of an item in an electronic shopping cart, identifying a referral source from which a user navigated to arrive at a product page having the item in an electronic shopping cart;
determining that the referral source and the product page were visited during a browsing session;
determining a negative sentiment of a product feature associated with the item, wherein the negative sentiment of the product feature is determined using content of the referral source, wherein the content of the referral source includes a negative description of the product feature;
based on the negative sentiment of the product feature, selecting positive targeted content related to the product feature associated with the item, wherein the positive targeted content includes a positive description of the product feature which is contrary to the negative description of the product feature in the content of the referral source, the targeted content intended to address the negative sentiment of the product feature associated with the item; and
providing the positive targeted content for the user to view in an effort to entice the user to complete a purchase of the item in the shopping cart.

2. The one or more computer storage media of claim 1, wherein the electronic shopping cart is deemed abandoned upon a time period of inactivity with the electronic shopping cart.

3. The one or more computer storage media of claim 1, wherein the referral source comprises a webpage associated with a blog post, a review, a set of search results, a social network post, or a combination thereof.

4. The one or more computer storage media of claim 1, wherein the referral source corresponds with a website that is separate from a website associated with the product page.

5. The one or more computer storage media of claim 1, wherein the negative sentiment is determined using a keyword level sentiment engine that determines a sentiment score in relation to the product feature.

6. The one or more computer storage media of claim 1, wherein the referral source comprises a webpage that includes at least one mention of the product feature.

7. The one or more computer storage media of claim 1 wherein the positive description of the product feature is included as part of a blog post, a review, a product specification, a social post, or a combination thereof.

8. The one or more computer storage media of claim 1, wherein the positive targeted content is provided via an electronic mail or an instant message.

9. A computer-implemented method for providing targeted content related to sentiment associated with products, the method comprising:
in accordance with an abandonment of an item in an electronic shopping cart, identifying a referral source from which a user navigated to arrive at a product page having the item in an electronic shopping cart;
determining that the referral source and the product page were visited during a browsing session;
determining a negative sentiment of a product feature associated with the item, wherein the negative sentiment of the product feature is determined using content of the referral source, wherein the content of the referral source includes a negative description of the product feature;
based on the negative sentiment of the product feature, selecting positive targeted content related to the product feature associated with the item, wherein the positive targeted content includes a positive description of the product feature which is contrary to the negative description of the product feature in the content of the referral source, the targeted content intended to address the negative sentiment of the product feature associated with the item; and
providing the positive targeted content for the user to view in an effort to entice the user to complete a purchase of the item in the shopping cart.

10. The method of claim 9, wherein the referral source comprises a webpage that includes at least one mention of the product feature.

11. The method of claim 9, wherein an indication of the referral source is identified in accordance with identifying an abandonment of the item in the electronic shopping cart.

12. The method of claim 9, wherein the negative sentiment is determined using a keyword level sentiment engine that determines a sentiment score in relation to the product feature.

13. The method of claim 9 further comprising generating a targeting email that includes the positive targeted content.

14. The method of claim 9, wherein analyzing the referral source further comprises:
determining that a term frequency associated with a competitor of the item exceeds a threshold value, wherein term frequency is determined using content of the referral source;
based on the term frequency associated with the competitor of the item exceeding a threshold value, determining a user sentiment of the item in association with the competitor of the item; and
selecting targeted content comparing the item to a product of the competitor, wherein the item and the product of the competitor have similar product features.

15. A computer-implemented method for providing targeted content related to sentiment associated with products, the method comprising:
in accordance with an abandonment of an item in an electronic shopping cart, identifying a referral source from which a user navigated to arrive at a product page having the item in an electronic shopping cart;
determining that the referral source and the product page were visited during a browsing session;
determining a negative sentiment of a product feature associated with the item, wherein the negative sentiment of the product feature is determined using content of the referral source, wherein the content of the referral source includes a negative description of the product feature;
based on the negative sentiment of the product feature, selecting positive targeted content related to the product feature associated with the item, wherein the positive targeted content includes a positive description of the product feature which is contrary to the negative description of the product feature in the content of the referral source, the targeted content intended to address the negative sentiment of the product feature associated with the item; and providing the positive targeted content for the user to view in an effort to entice the user to complete a purchase of the item in the shopping cart.

16. The method of claim 15, wherein the referral source comprises a webpage associated with a blog post, a review, a set of search results, a social network post, or a combination thereof.

17. The method of claim 15, wherein the referral source corresponds with a website that is separate from a website associated with the product page.

18. The method of claim 15, wherein the negative sentiment is determined using a keyword level sentiment engine that determines a sentiment score in relation to the product feature.

19. The method of claim 15, wherein the referral source comprises a webpage that includes at least one mention of the product feature.

20. The method of claim 15, wherein the positive description of the product feature is included as part of a blog post, a review, a product specification, a social post, or a combination thereof.

\* \* \* \* \*